July 20, 1943.  J. A. MAURER, JR  2,324,632
REDUCTION OF STRAY LIGHT
Filed Aug. 2, 1940  2 Sheets-Sheet 1
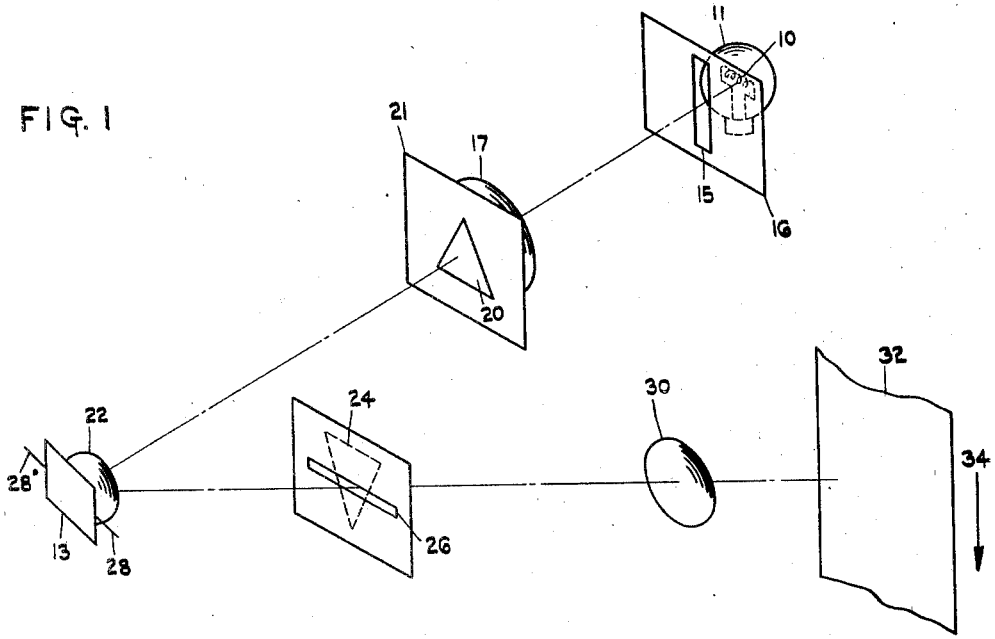
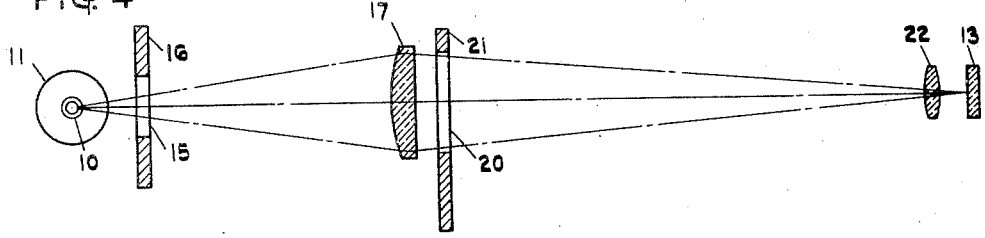
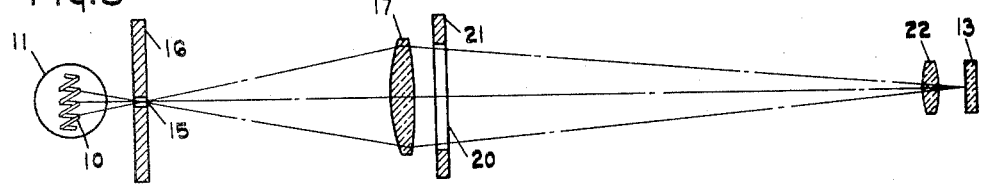
INVENTOR
JOHN A. MAURER, JR.
BY Otto J. Nathansohn
AGENT

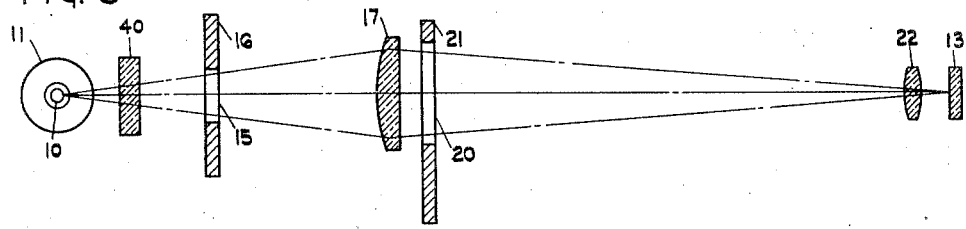
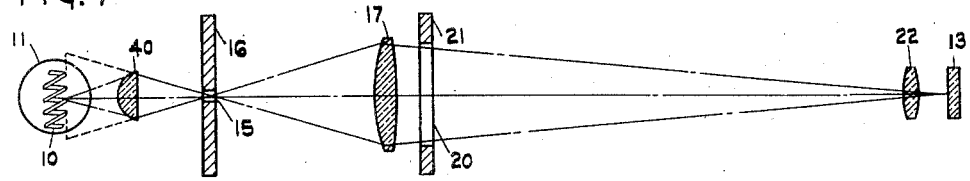
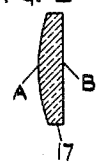 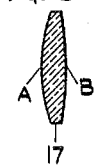 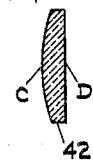 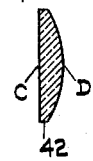
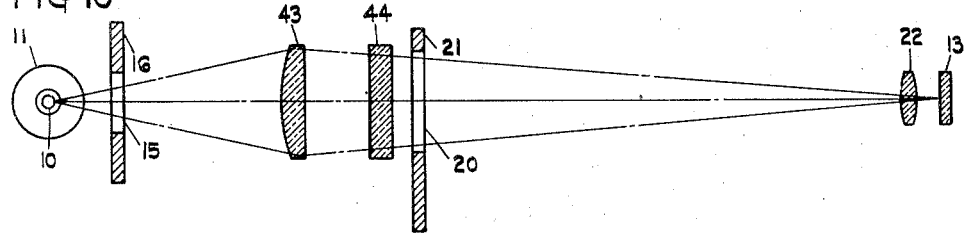
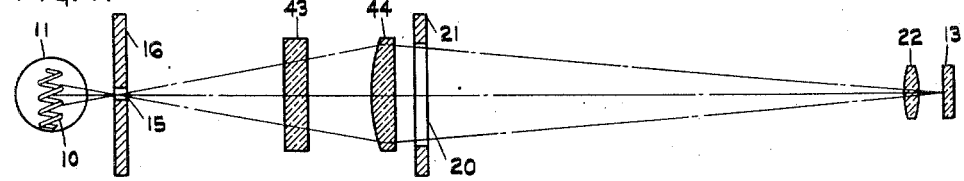

Patented July 20, 1943

2,324,632

UNITED STATES PATENT OFFICE 2,324,632

REDUCTION OF STRAY LIGHT

John A. Maurer, Jr., New York, N. Y., assignor, by mesne assignments, to J. A. Maurer, Inc., a corporation of New York Application August 2, 1940, Serial No. 349,514

4 Claims. (Cl. 88—24)

This invention relates to optical systems and particularly to optical systems for the photographic recording of electrical impulses on a moving film such as are used in sound recording, picture transmission, and the like. More particularly, the invention relates to the reduction of stray light in those optical systems of this class which employ an illuminated mirror to vibrate a beam of light.

In optical systems of the type described, a condenser lens or lens system is used to concentrate the light from a suitable light source on the mirror. Some light, however, leaves the light source in such a direction that it is incident on parts of the optical system other than the condenser lens, or on parts of the structure housing the optical system. Such light will, to some extent be reflected diffusely, thus forming stray light even though the surfaces on which it is incident may be black.

Furthermore, in optical systems of this type the light source and the mirror generally have different shapes, and the size of the mirror must be kept within comparatively small limits. When, therefore, an image of the light source is formed on the mirror in order to illuminate the mirror, some parts of this image may fall outside the mirror thus again giving rise to stray light.

The presence, in addition to the light beam vibrated by the mirror, of stray light in the optical system is objectionable because such stray light may cause an additional exposure of the film which should be exposed only to the vibrated light beam.

Another drawback of the known optical systems of the type under discussion is that the entire luminous areas of most light sources commonly employed with such optical systems are not uniformly bright so that even when the image of the light source is wholly within the bounds of the mirror, the mirror is not uniformly illuminated.

It is an object of the invention to provide, in optical systems of the type described, means by which stray light is considerably reduced.

Another object of the invention is the provision of an optical system of the type described in which the illumination of the mirror is uniform.

Other objects and advantages of the invention include those which are hereinafter stated or apparent, or which are incidental to the invention.

The objects of the invention are substantially achieved by providing in optical systems of the type described the following means for illuminating the mirror: Between an elongated light source and the condensing means that direct light from the light source upon the mirror, there is placed a screen having an aperture which is a rectangle with one of its sides extending at right angles to the direction in which the greatest dimension of the light source extends. The condensing means comprise first means acting in a plane at right angles to the direction in which the aforementioned side of the rectangle extends, and imaging the aperture on the mirror, and second means acting in a plane at right angles to the direction in which the greatest dimension of the light source extends, and imaging the light source on the mirror. In a preferred embodiment of the invention, however, this simultaneous imagery in two different planes of the light source and of the aperture is effected by a single means whose power is different in the two planes.

The term "elongated light source" will be used throughout the present specification for a light source which, whether it is coiled, flat, or has any other structural appearance, is characterized by the fact that its dimension in a particular direction is greater than its other dimensions. The direction in which the elongated light source has its greatest dimension and directions parallel to it will be called horizontal and directions at right angles to both the horizontal direction and the optical axis of the system will be called vertical. The plane which is at right angles to the vertical direction and which contains the greatest dimension of the elongated light source will be called the horizontal plane, and the plane which is at right angles to the horizontal direction will be called the vertical plane, the vertical plane being at right angles to the horizontal plane.

It will thus be seen that in the present specification the terms "vertical" and "horizontal" will not be used in any absolute sense but merely as indicating relative position or direction, and that choice between these terms has been determined merely by convenience in description and illustration.

The invention will be better understood when the following description is considered with the accompanying drawings of certain presently preferred embodiments thereof set forth by way of example, and its scope will be pointed out in the appended claims.

In the drawings:

Fig. 1 is a diagrammatic perspective view of an embodiment of the invention as included in an optical system for the photographic recording of electrical impulses on a moving film, Fig. 2 is a cross-section in the vertical plane of an element of Fig. 1, Fig. 3 is a corresponding section in the horizontal plane, Fig. 4 is a diagrammatic longitudinal section in the vertical plane of the portion of the optical system of Fig. 1 from parts 10 to 13, Fig. 5 is a corresponding section in the horizontal plane, Fig. 6 is a diagrammatic longitudinal section in the vertical plane of a modification of the optical system shown in Figs. 1, 4 and 5, Fig. 7 is a corresponding section in the horizontal plane.

Fig. 8 is a cross-section in the vertical plane of a modification of the element shown in Figs. 2 and 3, Fig. 9 is a corresponding section in the horizontal plane, Fig. 10 is a diagrammatic longitudinal section in the vertical plane of another modification of the optical system shown in Figs. 1, 4 and 5, and Fig. 11 is a corresponding section in the horizontal plane.

Throughout the drawings identical parts are designated by identical reference characters.

Referring first to Figs. 1 to 5, the means for reducing stray light according to the invention are shown as part of a conventional optical system for the photographic recording of electrical impulses on a moving film. Light from an elongated light source such as the filament 10 of an incandescent lamp 11 is directed to the mirror 13 of an oscillograph galvanometer (not shown) or similar device translating electrical impulses into mechanical vibrations. Between lamp filament 10 and mirror 13, the light passes through the preferably rectangular aperture 15 in the screen 16, the condenser lens 17, the triangular opening 20 in the screen 21, and the spherical lens 22. An image 24 of opening 20 is formed in the plane of the slit 26 by the action of lens 22. Vibration of mirror 13 about the horizontal axis 28—28 causes image 24 to move across slit 26 thereby illuminating more or less of slit 26. The spherical lens 30 produces on the film 32 an image of slit 26 or so much of slit 26 as is illuminated by image 24. When therefore mirror 13 is vibrated about axis 28—28 in known manner in accordance with the electrical impulses to be recorded, a symmetrical variable width record is produced on film 32 as it moves past the optical system in the direction indicated by the arrow 34.

This optical system differs from similar optical systems known heretofore in the manner in which the light from lamp filament 10 is concentrated on mirror 13. For the purpose of reducing stray light, the screen 16 containing the rectangular aperture 15 is placed in front of lamp 11 and the conventional spherical or cylindrical condenser lens is replaced by the lens 17 whose optical properties will be explained presently.

Screen 16 confines the light which emanates from lamp filament 10 and enters the rest of the optical system to that amount thereof which passes through aperture 15. The greatest dimension of lamp filament 10 extends horizontally, and aperture 15 has an edge which extends vertically.

Lens 17 is characterized by the fact that it has a greater focal length in the vertical plane than in the horizontal plane. To that end, it has a surface A which is spherical, and a surface B which is cylindrical with its cylinder axis vertical. This design of lens 17 is shown in Figs 2 and 3, Figs. 2 and 3 being cross-sections of lens 17 in the vertical and horizontal planes, respectively.

By the action of lens 17 in the vertical plane (see Fig. 4), an image of lamp filament 10 is formed on mirror 13. Lens 22 does not interfere with this imagery because its distance from mirror 13 is small compared to the focal length it must have to image opening 20 in the plane of slit 26. By its simultaneous action in the horizontal plane (see Fig. 5), lens 17 forms an image of aperture 15 on mirror 13.

This simultaneous imagery of lamp filament 10 by the action of lens 17 in the vertical plane and of aperture 15 by the action of lens 17 in the horizontal plane permits controlling the illumination of mirror 13 so that there is a minimum of stray light. All that need be done to achieve this result is to choose the position and focal length of lens 17 in such a manner that the image of lamp filament 10 formed by its action in the vertical plane has a vertical dimension no greater than that of mirror 13, and to choose the position and the horizontal extension or width of aperture 15 in such a manner that the image of aperture 15 formed by the action of lens 17 in the horizontal plane has a horizontal dimension no greater than that of mirror 13. Thus, all the light which proceeds directly from lamp filament 10 to lens 17 is concentrated within the area of mirror 13, while light from lamp filament 10 which does not proceed directly from lamp filament 10 to lens 17 is barred from the rest of the optical system by screen 16.

Ordinarily, the elongated light sources used in optical systems of the type under discussion are not of uniform brightness throughout their horizontal extension or length. They have, however, a central portion which is uniformly bright. This applies also to lamp filament 10 which has been shown and described hereinabove as an example of such an elongated light source. If, therefore, mirror 13 is to be uniformly illuminated by lamp filament 10, all of the light incident on lens 17 must emanate from the uniformly bright central portion of lamp filament 10. If, moreover, the illumination of mirror 13 is to be efficient, lens 17 must be completely filled with light from lamp filament 10.

Since aperture 15 is a rectangle with its longer sides extending vertically (see Fig. 1), screen 16 is open in the vertical plane and lens 17 is filled with light in this plane. Furthermore, in this plane, all the light incident on lens 17 emanates from the uniformly bright central portion of lamp filament 10.

Lens 17 is filled with light also in the horizontal plane when, as seen from each point of lens 17 in this plane, aperture 15 is filled with light from lamp filament 10. This is the case if lamp filament 10 is long enough to subtend at least as great an angle at aperture 15 as is subtended there by lens 17 in this plane as is the case in Fig. 5. When, moreover, the angle subtended at aperture 15 by the uniformly bright central portion of lamp filament 10 is at least as great as the angle subtended there by lens 17 in the horizontal plane, all the light incident on lens 17 emanates from the uniformly bright central portion of lamp filament 10. In this case, therefore, mirror 13 is efficiently and uniformly illuminated.

When the length of the uniformly bright central portion of lamp filament 10 is not sufficiently great to satisfy the condition stated in the preceding paragraph, the illumination of mirror 13 is not uniform. If, in addition, the length of the entire luminous portion of lamp filament 10 is not great enough to satisfy the above condition, the illumination of mirror 13 is reduced because lens 17 is no longer filled with light in the horizontal plane.

In order to compensate for this reduction a cylindrical lens 40 (see Figs. 6 and 7) with its cylinder axis vertical may be placed between lamp filament 10 and screen 16. Cylindrical lens 40 acts in the horizontal plane only and forms an image of lamp filament 10 at aperture 15. By this action of cylindrical lens 40, the apparent length of the uniformly bright central portion of lamp filament 10 as seen from lens 17 is increased to a value which is determined by the constants of cylindrical lens 40 (see Fig. 7). These constants of cylindrical lens 40 can be so chosen that the apparent length of the uniformly bright central portion of lamp filament 10 as seen from lens 17 is made sufficiently great to fill lens 17 in the horizontal plane with light emanating from this portion of lamp filament 10. Thus, mirror 13 is again efficiently and uniformly illuminated when lens 17 simultaneously images lamp filament 10 on mirror 13 by its action in the vertical plane (see Fig. 6) and aperture 15 on mirror 13 by its action in the horizontal plane (see Fig. 7).

The invention has been shown and described hereinabove as part of an optical system for producing variable width records. It may, however, be incorporated in any other optical system for the photographic recording of electrical impulses on a moving film in which light from an elongated light source is to be concentrated on a small mirror. For example, the objects of the invention can be attained also when opening 20 in screen 21 (Fig. 1) is a right-angled triangle or a rectangle, or when it has any other shape desired. Furthermore, the axis of mirror 13 may be horizontal as is axis 28—28 shown in Fig. 1, or vertical, or it may have any other desired direction. Finally, the invention may also be applied if light from an elongated light source is to be concentrated on a stationary mirror which is so small that stray light would arise unless particular means are employed for reducing it.

When lens 22 is not placed close to mirror 13 as it is in Fig. 1, or when other lenses are placed between light source 10 and mirror 13, lens 17 must be so designed that in combination with lens 22 or with these other lenses it simultaneously acts in the vertical plane to image lamp filament 10 on mirror 13 and in the horizontal plane to image aperture 15 on mirror 13.

Lens 17 (Figs. 2 and 3) may be replaced by any combination of cylindrical, or cylindrical and spherical, or cylindrico-spherical lenses which simultaneously images lamp filament 10 on mirror 13 by its action in the vertical plane and aperture 15 on mirrors 13 by its action in the horizontal plane. For example, lens 17 may be replaced by a single lens 42 with two cylindrical surfaces C and D whose cylinder axes are at right angles to each other. As will be seen from Figs. 8 and 9 which are cross-sections of lens 42 in the vertical and horizontal planes, respectively, the radius of surface C is longer than that of surface D so that when lens 42 is substituted for lens 17 in the optical system shown in Fig. 1, it simultaneously images lamp filament 10 on mirror 13 by its action in the vertical plane and aperture 15 on mirror 13 by its action in the horizontal plane.

An arrangement in which lens 17 is replaced by two cylindrical lenses with their cylinder axes at right angles to each other is shown, by way of further example, in Figs. 10 and 11 where the cylindrical lenses 43 and 44 are substituted for lens 17 in the optical system of Figs. 1, 4 and 5. Cylindrical lens 43, whose cylinder axis is horizontal, acts in the vertical plane (see Fig. 10) to image lamp filament 10 on mirror 13. Cylindrical lens 44, whose cylinder axis is vertical, acts in the horizontal plane (see Fig. 11) to image lamp filament 10 on mirror 13. In the same manner the condenser lens system consisting of cylindrical lenses 43 and 44 may be substituted for condenser lens 17 in the optical system of Figs. 6 and 7.

Condenser lens 17 and its substitutes have been shown and described hereinabove as being placed between screen 16 and screen 21. They may, however, have any other position between screen 16 and mirror 13 which is consistent with their function simultaneously to image on mirror 13 lamp filament 10 by their action in the vertical plane and aperture 15 by their action in the horizontal plane.

The images of lamp filament 10 and aperture 15 formed by the condenser lens 17 or its substitutes have been described hereinabove as being formed on mirror 13. No harm will result, however, if these images are formed substantially on mirror 13, that is, either on mirror 13 or in a plane close thereto. In this case, the light spot that illuminates mirror 13 has dimensions substantially the same as the dimensions of the images of lamp filament 10 and aperture 15 in the vertical and horizontal planes, respectively, so that all the light flux which is acted upon by the condenser lens or lens system may again be concentrated within the area of mirror 13.

Many other modifications of the invention will readily suggest themselves to those skilled in the art. The invention, therefore, is not to be limited, except in so far as is necessitated by the prior art and by the spirit of the appended claims.

What is claimed is:

1. In an optical system for the photographic recording of the vibrations of a mirror, which optical system includes an elongated light source whose greatest dimension extends horizontally, a first screen with an opening, said opening being illuminated by said light source, and means forming an image of said opening, said image being movable by said vibrations of said mirror, the combination of a second screen having an aperture which is a rectangle with one of its sides extending vertically, said second screen being placed between said light source and said first screen; and a condensing lens having one surface spherical and one surface cylindrical with its cylinder axis vertical and simultaneously imaging substantially on said mirror said light source by its action in the vertical plane and said aperture by its action in the horizontal plane.

2. In an optical system for the photographic recording of the vibrations of a mirror, which optical system includes an elongated light source whose greatest dimension extends horizontally, a first screen with an opening, said opening being illuminated by said light source, and means forming an image of said opening, said image being movable by said vibrations of said mirror, the combination of a second screen having an aperture which is a rectangle with one of its sides extending vertically, said second screen being placed between said light source and said first screen; and a condensing lens having both surfaces cylindrical, the cylinder axis of one surface extending vertically while the cylinder axis of the other surface extends horizontally, and simultaneously imaging substantially on said mirror said light source by its action in the vertical plane and said aperture by its action in the horizontal plane.

3. In an optical system for the photographic recording of the vibrations of a mirror, which optical system includes an elongated light source whose greatest dimension extends horizontally, a first screen with an opening, said opening being illuminated by said light source, and means forming an image of said opening, said image being movable by said vibrations of said mirror, the combination of a second screen having an aperture which is a rectangle with one of its sides extending vertically, said second screen being placed between said light source and said first screen; a condensing lens having one surface spherical and one surface cylindrical with its cylinder axis vertical and simultaneously imaging substantially on said mirror said light source by its action in the vertical plane and said aperture by its action in the horizontal plane; and a cylindrical lens having its cylinder axis vertical and imaging said light source at said aperture.

4. In an optical system for the photographic recording of the vibrations of a mirror, which optical system includes an elongated light source whose greatest dimension extends horizontally, a first screen with an opening, said opening being illuminated by said light source, and means forming an image of said opening, said image being movable by said vibrations of said mirror, the combination of a second screen having an aperture which is a rectangle with one of its sides extending vertically, said second screen being placed between said light source and said first screen; a condensing lens having both surfaces cylindrical, the cylinder axis of one surface extending vertically while the cylinder axis of the other surface extends horizontally, and simultaneously imaging substantially on said mirror said light source by its action in the vertical plane and said aperture by its action in the horizontal plane; and a cylindrical lens having its cylinder axis vertical and imaging said light source at said aperture.

JOHN A. MAURER, Jr.